(12) United States Patent
Matthews

(10) Patent No.: US 6,954,152 B1
(45) Date of Patent: Oct. 11, 2005

(54) SIDE VIEW MIRROR AND CAMERA ASSEMBLY

(76) Inventor: Frederick L. Matthews, 226 Carroll Ave. SE., Grand Rapids, MI (US) 49506

( * ) Notice: Subject to any disclaimer, the term of this patent is extended or adjusted under 35 U.S.C. 154(b) by 140 days.

(21) Appl. No.: 10/302,609

(22) Filed: Nov. 22, 2002

(51) Int. Cl.7 .............................................. G08G 1/017
(52) U.S. Cl. ................. 340/937; 340/901; 340/426.15; 340/438; 348/148; 348/143; 348/375; 348/376
(58) Field of Search ............................. 340/937, 901, 340/426.15, 438; 348/148, 143, 375, 335

(56) References Cited

U.S. PATENT DOCUMENTS

| 5,235,469 A | 8/1993 | Horian |
| 5,479,297 A | 12/1995 | Summers |
| 5,523,811 A * | 6/1996 | Wada et al. ................. 396/429 |
| 5,666,227 A | 9/1997 | Ben-Ghiath |
| 5,670,935 A | 9/1997 | Schofield |
| 6,333,759 B1 * | 12/2001 | Mazzilli ...................... 348/148 |
| 6,583,730 B2 * | 6/2003 | Lang et al. .................. 340/905 |
| 2002/0113873 A1 * | 8/2002 | Williams ..................... 348/118 |
| 2003/0193613 A1 * | 10/2003 | Matko et al. ................ 348/375 |

* cited by examiner

Primary Examiner—Tai Nguyen

(57) ABSTRACT

A side view mirror and camera assembly for providing a mirror combined with a camera directed towards the blind spot of the mirror to allow a driver of a vehicle to view objects near the vehicle that are not viewable using the side view mirror alone. The side view mirror and camera assembly includes an adjustable camera coupled to a side view mirror housing to show a view of the blind spot of the side view mirror on a display viewable by a driver of a vehicle. In an embodiment, the camera is positioned within the side view mirror housing behind a one way portion viewing of the mirror.

12 Claims, 7 Drawing Sheets

SIDE VIEW MIRROR AND CAMERA ASSEMBLY

BACKGROUND OF THE INVENTION

1. Field of the Invention

The present invention relates to blind spot eliminating devices and more particularly pertains to a new side view mirror and camera assembly for providing a mirror combined with a camera directed towards the blind spot of the mirror to allow a driver of a vehicle to view objects near the vehicle that are not viewable using the side view mirror alone.

2. Description of the Prior Art

The use of blind spot eliminating devices is known in the prior art. U.S. Pat. No. 5,235,469 describes a horizontal cut stepped mirror mounted to the pillars of an automobile. Another type of blind spot eliminating device is U.S. Pat. No. 5,479,297 disclosing a side view mirror assembly having a fixed mirror and a movable mirror. U.S. Pat. No. 5,666,227 discloses panoramic bi-directional mirrors aimed to the front and to the rear of the driver's field of view. U.S. Pat. No. 5,670,935 discloses image capturing devices used to capture multiple images to the rear of a vehicle and a synthesized view formed from the captured images from the point of view of a single image capture device positioned forward of the vehicle.

While these devices fulfill their respective, particular objectives and requirements, the need remains for a device that combines a side view mirror to which drivers are already accustomed with an adjustable camera connected to a separate display for showing objects in the blind spots of the side view mirrors.

SUMMARY OF THE INVENTION

The present invention meets the needs presented above by providing an adjustable camera positioned within a side view mirror housing to show a view of the blind spot of the side view mirror on a display viewable by a driver of a vehicle.

An object of the present invention is to provide a new side view mirror and camera assembly that provides a view from a side view mirror to which the majority of drivers are already accustomed in combination with a view of the blind spot of the side view mirror provided by a camera directed towards the blind spot of the side view mirror.

Another object of the present invention is to provide a new side view mirror and camera assembly that provides a driver with comprehensive viewing of the areas adjacent to a vehicle using side view mirrors and a display inside the vehicle.

To this end, the present invention generally comprises an adjustable camera coupled to a side view mirror housing to show a view of the blind spot of the side view mirror on a display viewable by a driver of a vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
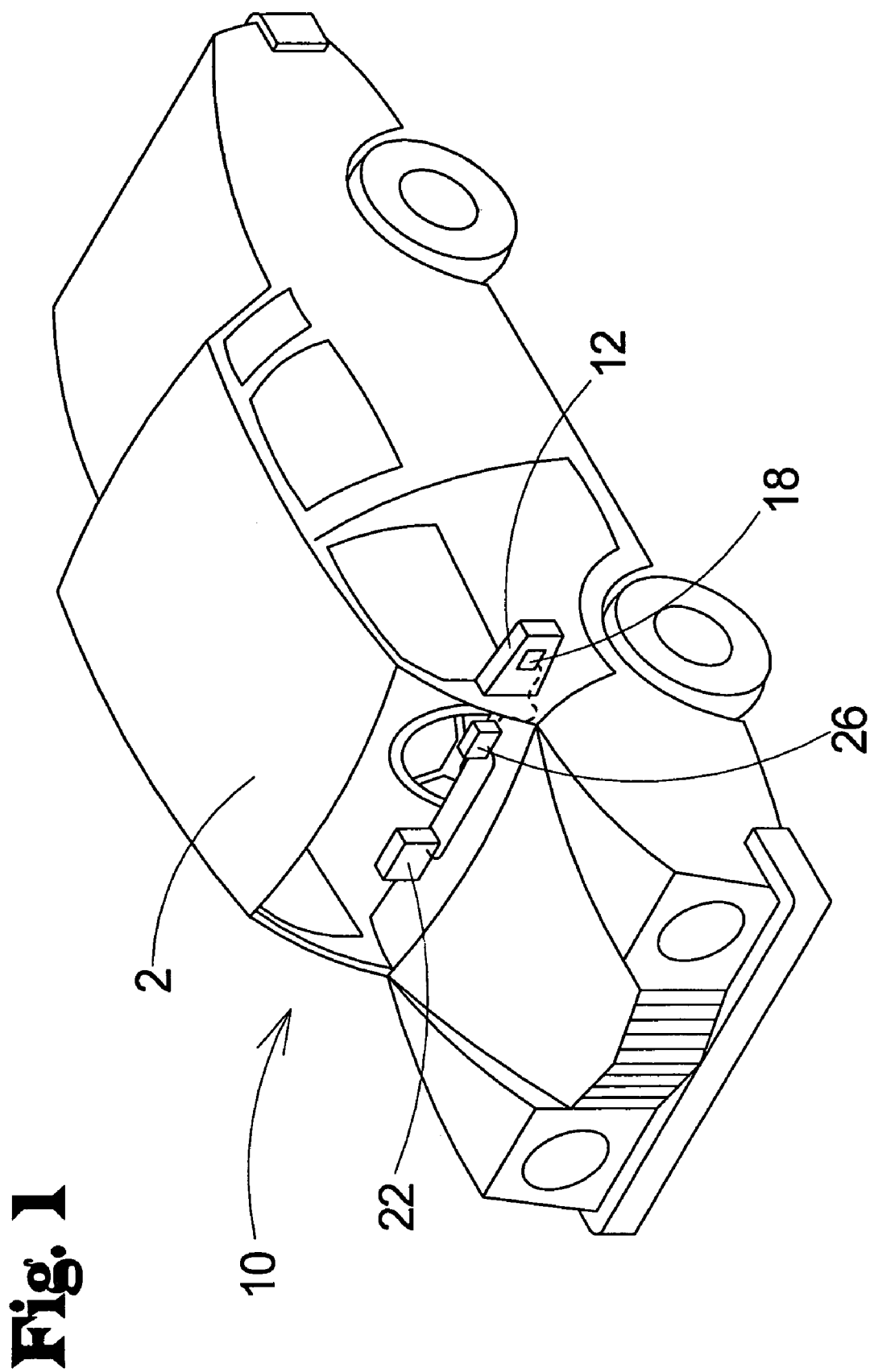
FIG. 1 is a perspective view of a new side view mirror and camera assembly according to the present invention.
Figure 2:
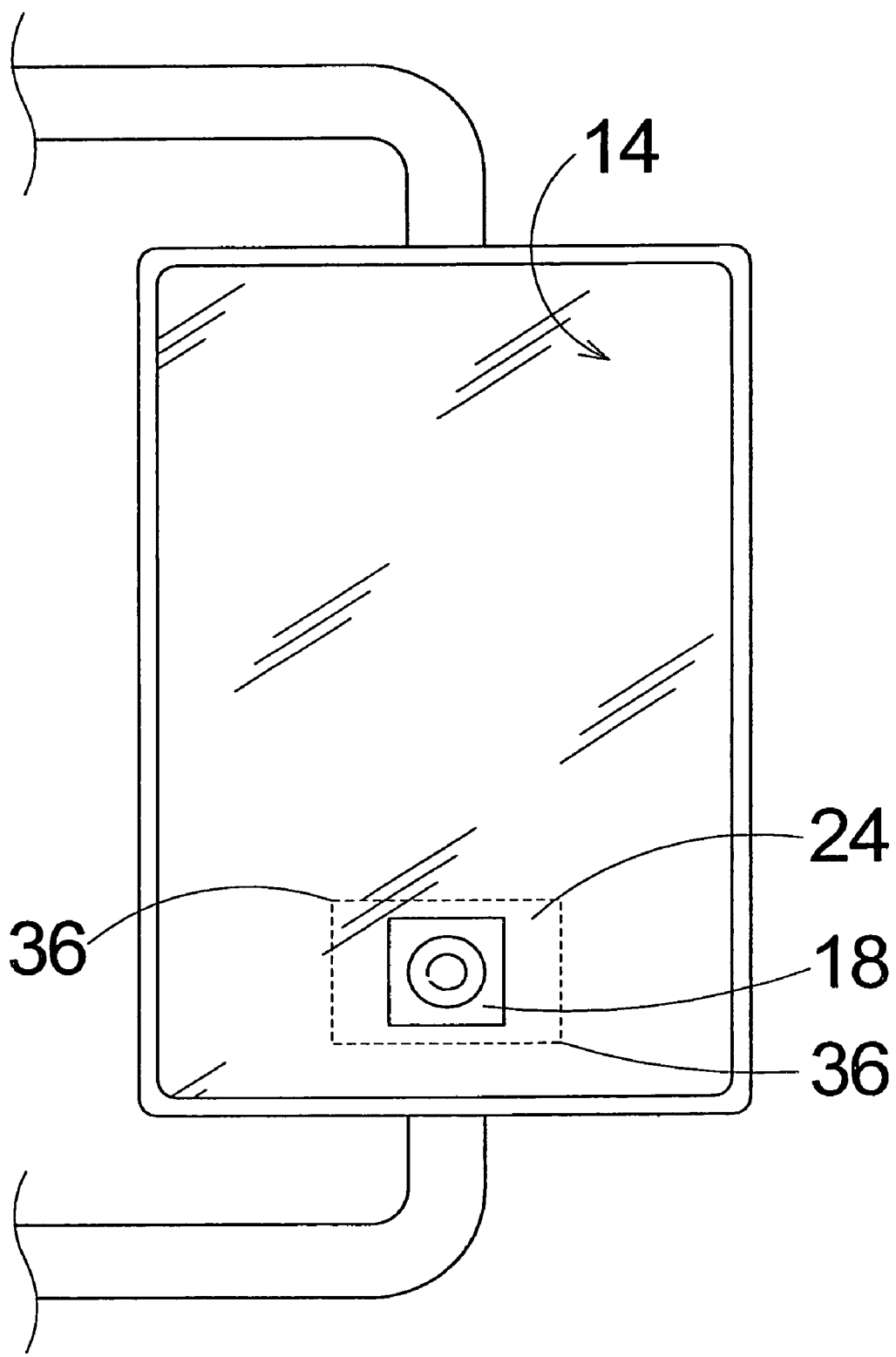
FIG. 2 is a front view of the present invention.
Figure 3:
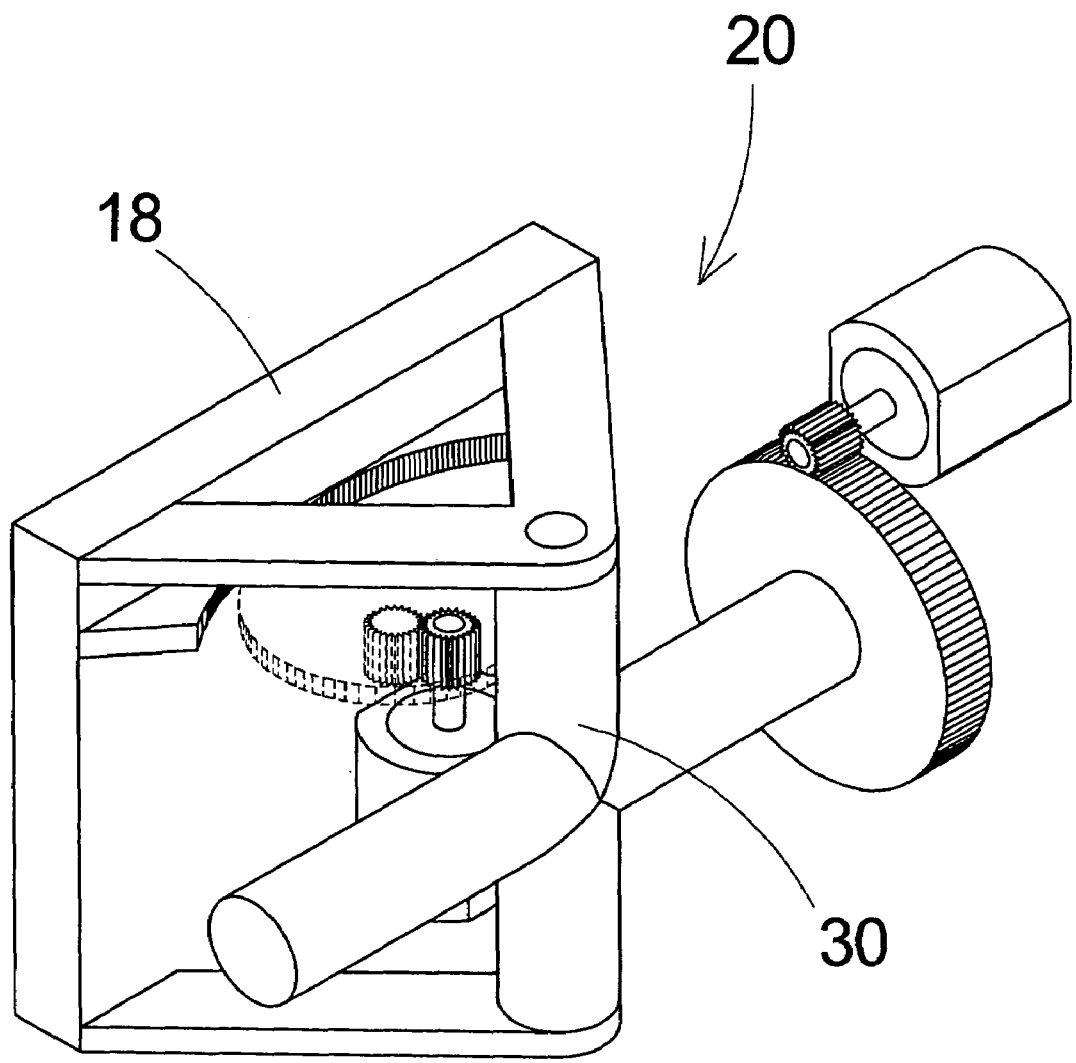
FIG. 3 is a perspective view of the camera mount assembly of the present invention.
Figure 4:
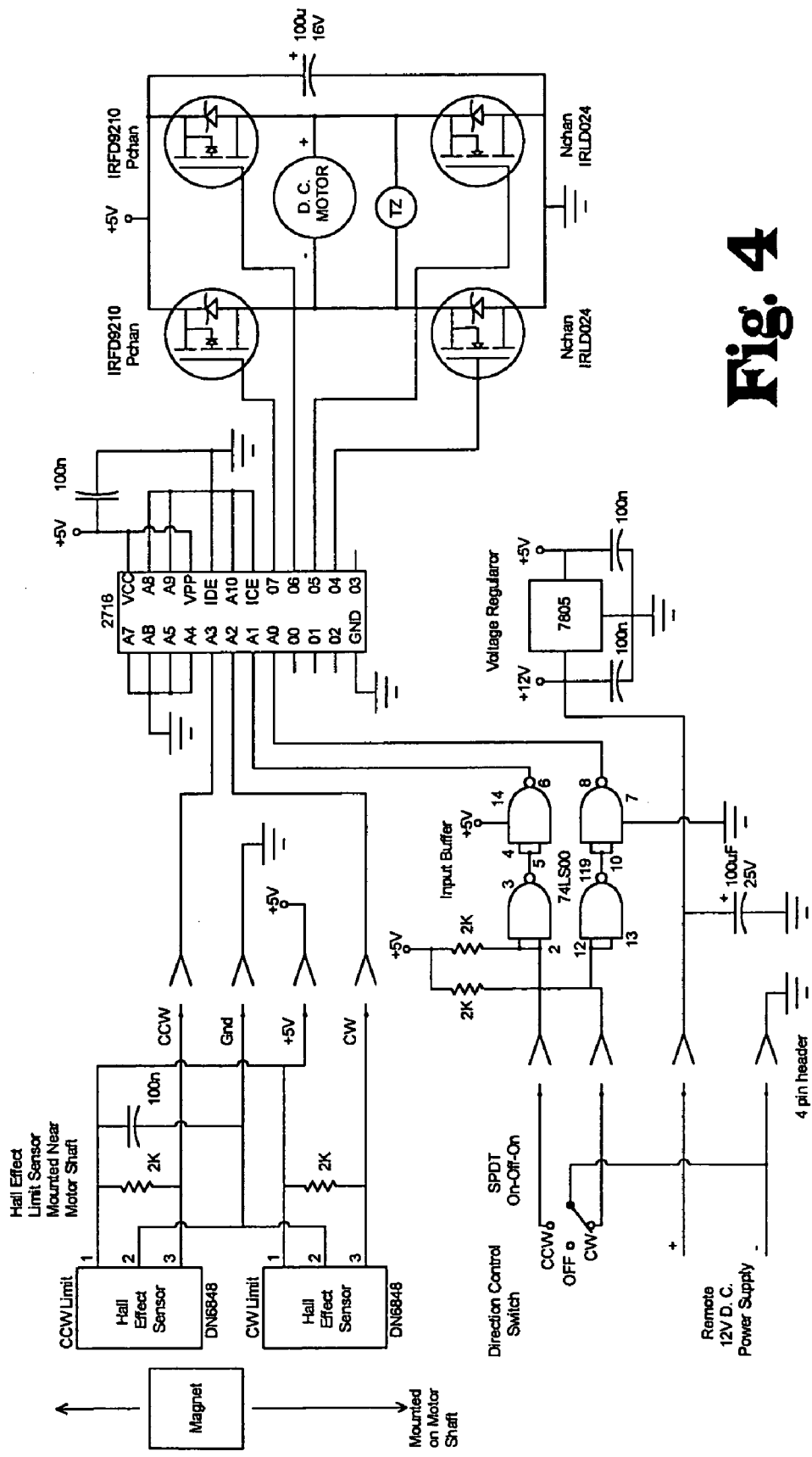
FIG. 4 is a schematic view of circuitry for the present invention.
Figure 5:
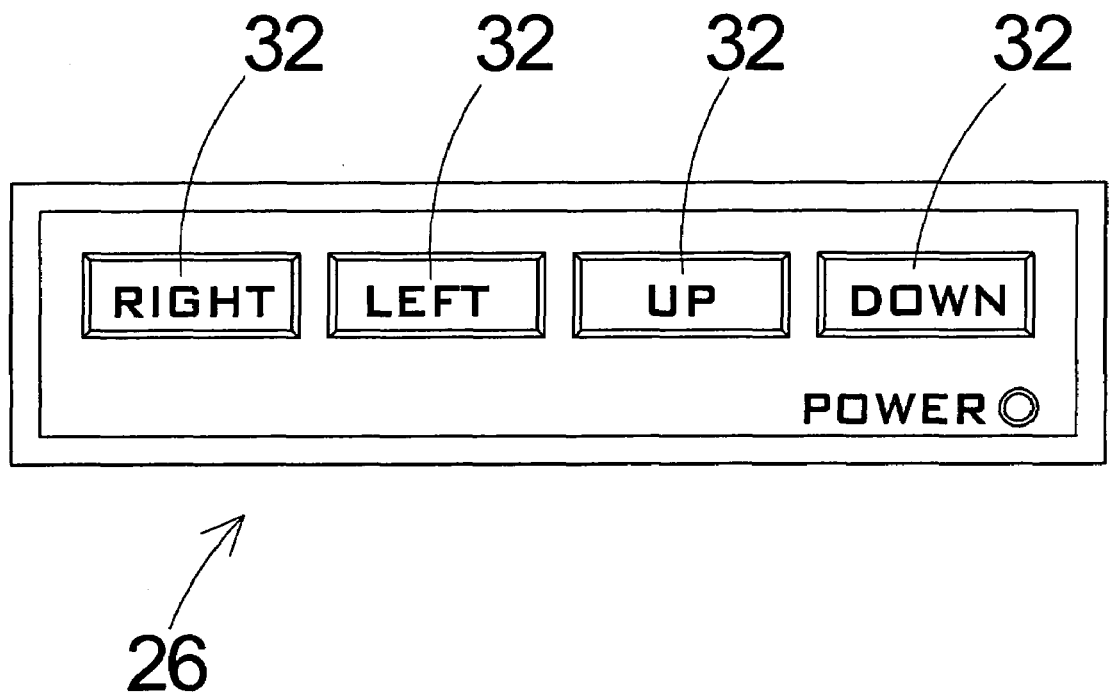
FIG. 5 is a front view of the camera control unit present invention.
Figure 6:
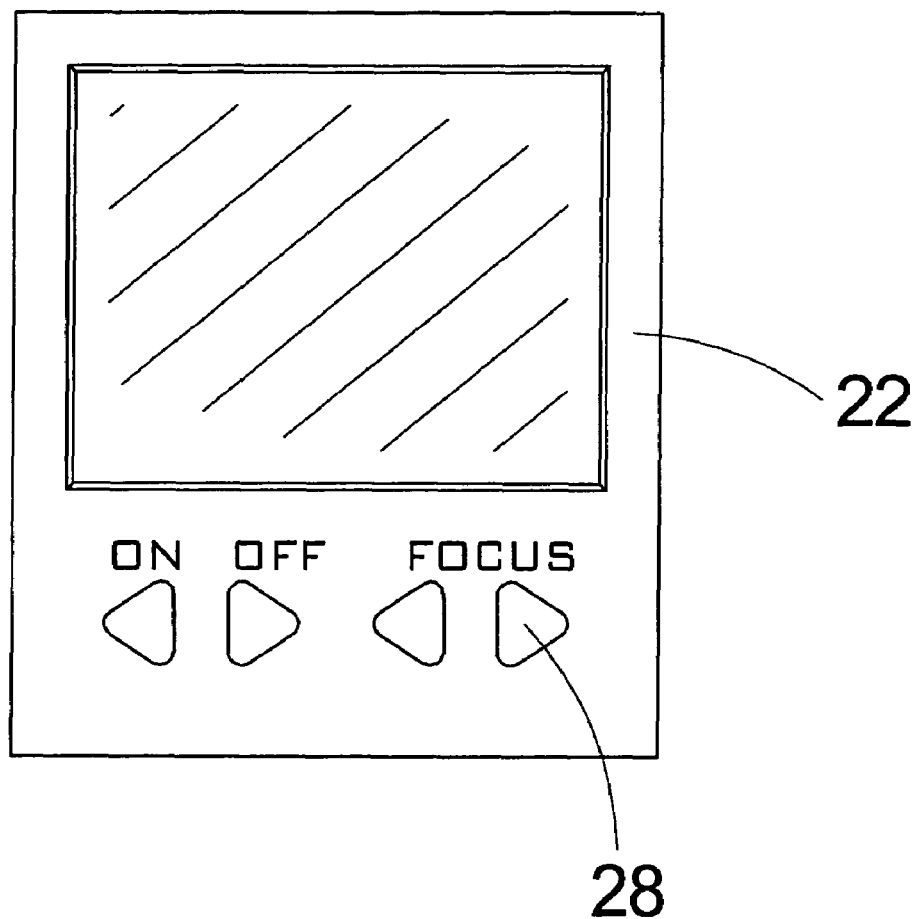
FIG. 6 is a front view of the display of the present invention.
Figure 7:
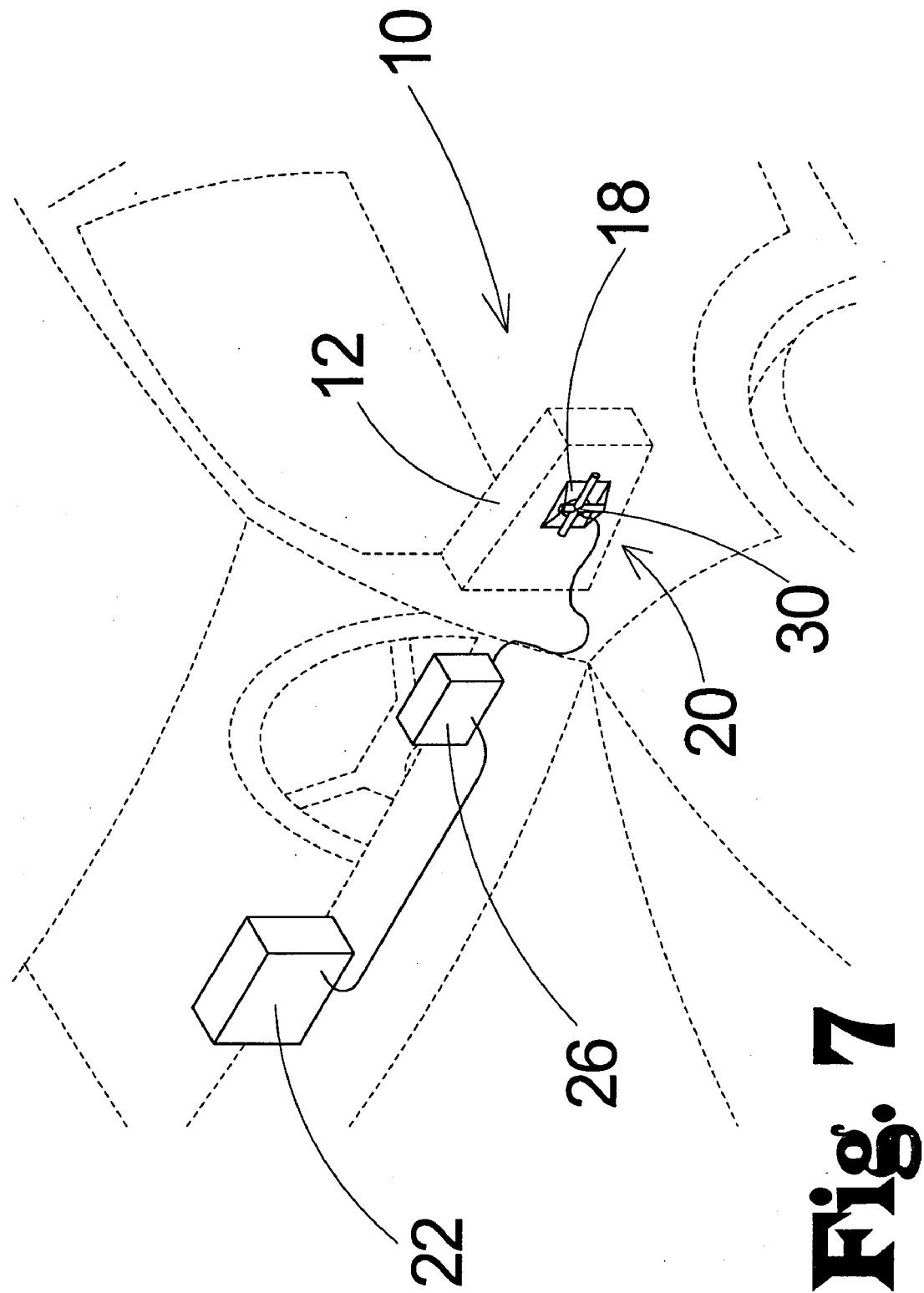
FIG. 7 is a perspective view of an alternate embodiment of the present invention for retrofitting to existing side view mirror housings.

With reference now to the drawings, and in particular to FIGS. 1 through 7 thereof, a new side view mirror and camera assembly embodying the principles and concepts of the present invention and generally designated by the reference numeral 10 will be described.

As best illustrated in FIGS. 1 through 7, the side view mirror and camera assembly 10 generally comprises a side view mirror housing 12 coupled to a vehicle 2. The side view mirror housing 12 includes an opening 14. A mirror 16 is coupled to the side view mirror housing 12 in the opening 14. A camera 18 is coupled to the side view mirror housing 12. Adjustment means 20 are provided for adjusting the camera 18 to capture an image of a desired area adjacent to the vehicle 2. A display 22 is positioned inside the vehicle 2. The camera 18 is operationally coupled to the display 22 using a coaxial cable. Thus, the display 22 displays the image captured by the camera 18.

In an embodiment, the mirror 16 includes a one way mirror portion 24 and the camera 18 is positioned within the housing 12 behind the one way mirror portion 24.

The adjustment means 20 includes a camera control unit 26 positioned within the vehicle 2 such that the camera control unit 26 is accessible to a driver of the vehicle 2. The camera control unit 26 is operationally coupled to the camera 18 using conventional electrical wiring for adjusting a position of the camera 18 such that a selectable area is viewable on the display 22.

Focusing means 28 are coupled to the display 22 for manually adjusting focus of the image shown on the display 22.

The adjustment means 20 may include a camera mount assembly 30 coupled to the camera 18. The camera mount assembly 30 is pivotable in a vertical direction and a horizontal direction.

In an embodiment, the camera control unit 26 includes user interface inputs 32 for moving the camera left, right, up and down.

The camera mount assembly 30 includes a generally X-shaped frame 34 coupled to outside corners 36 of the camera 18.

In an alternate embodiment for retrofitting to existing side view mirrors, the adjustment means 20 and the camera 18 are positioned outside the side view mirror housing 12.

In use, the side view mirror acts as a conventional mirror and is positioned as desired by the driver of a vehicle. The camera is then adjusted using the camera control unit to aim the camera at the area not viewable in the side view mirror, the blind spot. The display in the vehicle is focused to provide the driver with images of the blind spot as captured by the camera.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A side view mirror and camera system for providing a comprehensive view of areas surrounding a vehicle, said system comprising:
   a side view mirror housing coupled to the vehicle, said side view mirror housing having an opening;
   a mirror coupled to said side view mirror housing and positioned in said opening;
   a camera coupled to said side view mirror housing;
   adjustment means for adjusting said camera to capture an image of a desired area adjacent to said vehicle; and
   a display positioned inside the vehicle, said camera being operationally coupled to said display whereby said display displays said image captured by said camera;
   wherein said adjustment means and said camera are positioned outside of said side view mirror housing.

2. The side view mirror and camera system of claim 1 wherein said mirror includes a one way mirror portion and said camera is positioned within said housing behind said one way mirror portion.

3. The side view mirror and camera system of claim 2 further comprising:
   said adjustment means including a camera control panel positioned within the vehicle such that said camera control unit is accessible to a driver of the vehicle, said camera control panel being operationally coupled to said camera for adjusting a position of said camera such that a selectable area is viewable on said display.

4. The side view mirror and camera system of claim 3, further comprising:
   focusing means coupled to said display for manually adjusting focus of said display.

5. The side view mirror and camera system of claim 3 wherein said camera control panel includes user interface inputs for moving said camera left, right, up and down.

6. The side view mirror and camera system of claim 2 further comprising:
   said adjustment means including a camera mount assembly coupled to said camera, said camera mount assembly being pivotable in a vertical direction and a horizontal direction.

7. The side view mirror and camera system of claim 1 further comprising:
   said adjustment means including a camera control panel positioned within the vehicle such that said camera control unit is accessible to a driver of the vehicle, said camera control panel being operationally coupled to said camera for adjusting a position of said camera such that a selectable area is viewable on said display.

8. The side view mirror and camera system of claim 7, further comprising:
   focusing means coupled to said display for manually adjusting focus of said display.

9. The side view mirror and camera system of claim 7 wherein said camera control panel includes user interface inputs for moving said camera left, right, up and down.

10. The side view mirror and camera system of claim 1 further comprising:
    said adjustment means including a camera mount assembly coupled to said camera, said camera mount assembly being pivotable in a vertical direction and a horizontal direction.

11. A side view mirror and camera system for providing a comprehensive view of areas surrounding a vehicle, said system comprising:
    a side view mirror housing coupled to the vehicle, said side view mirror housing having an opening;
    a mirror coupled to said side view mirror housing and positioned in said opening;
    a camera coupled to said side view mirror housing;
    adjustment means for adjusting said camera to capture an image of a desired area adjacent to said vehicle; and
    a display positioned inside the vehicle, said camera being operationally coupled to said display whereby said display displays said image captured by said camera;
    said adjustment means including a camera mount assembly coupled to said camera, said camera mount assembly being pivotable in a vertical direction and a horizontal direction;
    wherein said camera mount assembly includes a generally X-shaped frame coupled to outside corners of said camera.

12. A side view mirror and camera system for providing a comprehensive view of areas surrounding a vehicle, said system comprising:
    a side view mirror housing coupled to the vehicle, said side view mirror housing having an opening;
    a mirror coupled to said side view mirror housing and positioned in said opening;
    a camera coupled to said side view mirror housing;
    adjustment means for adjusting said camera to capture an image of a desired area adjacent to said vehicle; and
    a display positioned inside the vehicle, said camera being operationally coupled to said display whereby said display displays said image captured by said camera;
    wherein said mirror includes a one way mirror portion and said camera is positioned within said housing behind said one way mirror portion;
    said adjustment means including a camera mount assembly coupled to said camera, said camera mount assembly being pivotable in a vertical direction and a horizontal direction;
    wherein said camera mount assembly includes a generally X-shaped frame coupled to outside corners of said camera.

* * * * *